United States Patent
Schumann et al.

(10) Patent No.: US 8,794,720 B2
(45) Date of Patent: Aug. 5, 2014

(54) METHOD FOR THE SECURED RELEASE OF AN ELECTROMECHANICALLY ACTUABLE PARKING BRAKE

(75) Inventors: Marcus Schumann, Edingen-Neckarhausen (DE); Christof Maron, Kelkheim (DE); Jürgen Völkel, Frankfurt am Main (DE)

(73) Assignee: Continental Teves AG & Co. oHG (DE)

(*) Notice: Subject to any disclaimer, the term of this patent is extended or adjusted under 35 U.S.C. 154(b) by 990 days.

(21) Appl. No.: 12/677,345

(22) PCT Filed: Sep. 3, 2008

(86) PCT No.: PCT/EP2008/061611
§ 371 (c)(1),
(2), (4) Date: Mar. 10, 2010

(87) PCT Pub. No.: WO2009/033990
PCT Pub. Date: Mar. 19, 2009

(65) Prior Publication Data
US 2010/0193302 A1    Aug. 5, 2010

(30) Foreign Application Priority Data

Sep. 12, 2007 (DE) .......... 10 2007 043 555
Apr. 14, 2008 (DE) .......... 10 2008 018 749

(51) Int. Cl.
*B60T 13/00* (2006.01)
*B60T 8/72* (2006.01)
*B60T 8/32* (2006.01)

(52) U.S. Cl.
USPC .............. 303/191; 303/20; 303/174

(58) Field of Classification Search
USPC .......... 188/1.11 R, 1.11 E, 216, 72.8; 303/20, 303/191, 122.03, 122.04, 122.11, 174; 701/70
See application file for complete search history.

(56) References Cited

U.S. PATENT DOCUMENTS

| | | | |
|---|---|---|---|
| 6,209,689 B1 | 4/2001 | Böhm | |
| 6,394,235 B1 * | 5/2002 | Poertzgen et al. | 188/72.6 |
| 8,230,983 B2 * | 7/2012 | Bailey et al. | 188/1.11 L |
| 8,430,213 B2 * | 4/2013 | Yokoyama et al. | 188/1.11 L |

FOREIGN PATENT DOCUMENTS

| | | |
|---|---|---|
| DE | 197 32 168 C1 | 1/1999 |
| DE | 199 08 062 A1 | 8/2000 |

(Continued)

*Primary Examiner* — Vishal Sahni
(74) *Attorney, Agent, or Firm* — RatnerPrestia

(57) ABSTRACT

A method to limit overheating of a brake equipped with an electromechanically actuable parking brake including the steps of: driving a threaded spindle by an electric motor until a power drain ($I_{max}$), corresponding to a brake application force (F), is reached; detection of a travel distance ($x_0$) of the piston corresponding to the brake application force (F) of the brake caliper in a locked state; determination of a second travel distance ($x_1$) by adding a further travel distance value ($x_{11}$), which corresponds to the desired clearance value, to form ($x_0$); driving of the electric motor until the second travel distance ($x_1$) has been covered by the brake piston; and comparing the vehicle speed with a predefined first speed value, at the upward transgression of which the electric motor is driven once more in the release direction until a further, previously defined travel distance ($x_{12}$) has been covered.

6 Claims, 5 Drawing Sheets

(56) References Cited

FOREIGN PATENT DOCUMENTS

| FR | 2 808 486 | | 11/2001 |
|---|---|---|---|
| FR | 2 906 209 | | 3/2008 |
| JP | 2005-265063 | * | 9/2005 |
| WO | WO 99/26829 | | 6/1999 |
| WO | WO 2006085047 | * | 8/2006 |

* cited by examiner

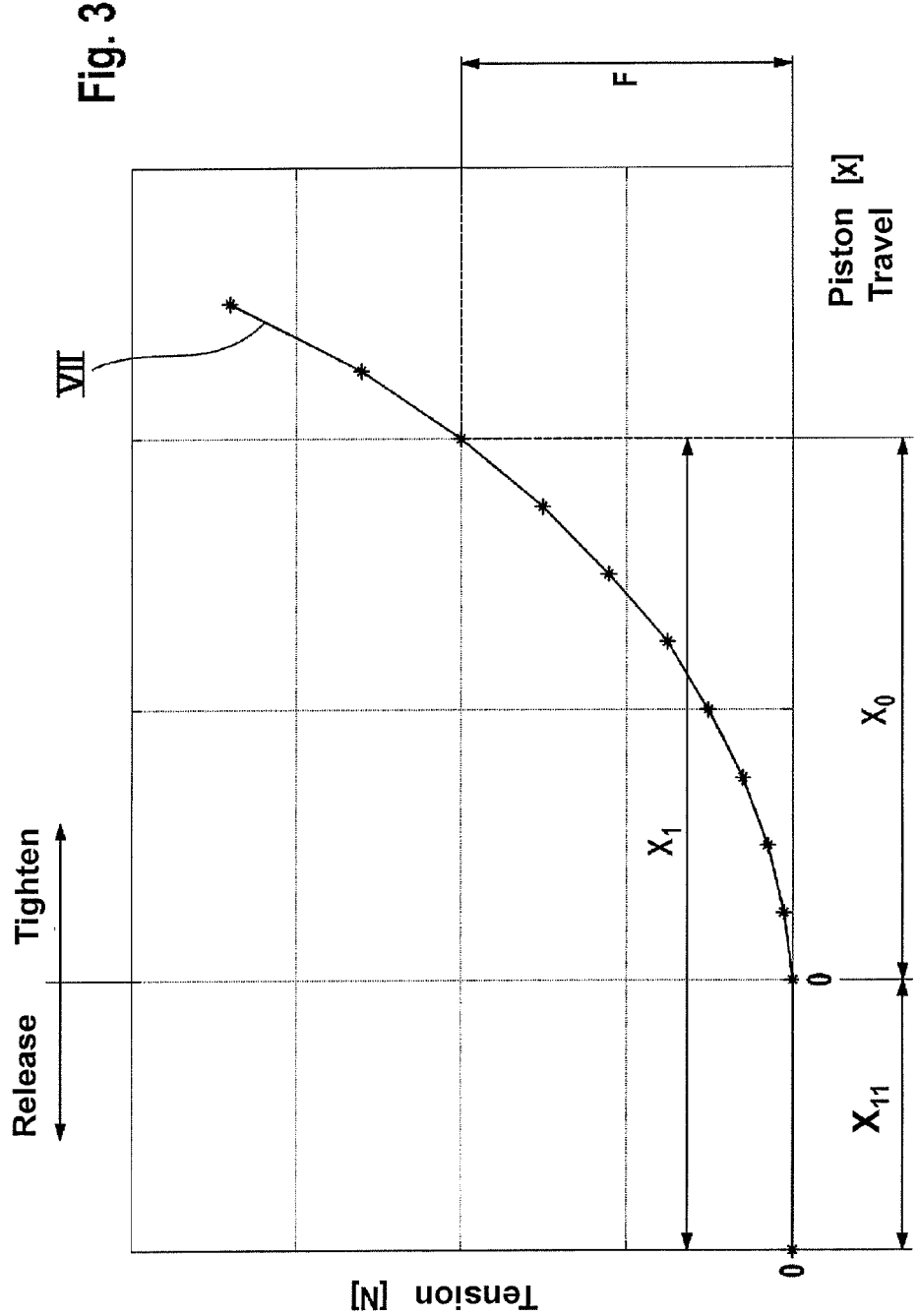

METHOD FOR THE SECURED RELEASE OF AN ELECTROMECHANICALLY ACTUABLE PARKING BRAKE

CROSS REFERENCE TO RELATED APPLICATIONS

This application is the U.S. national phase application of PCT International Application No. PCT/EP2008/061611, filed Sep. 3, 2008, which claims priority to German Patent Application No. 10 2008 018 749.6, filed Apr. 14, 2008, and German Patent Application No. 10 2007 043 555.1, filed Sep. 12, 2007, the contents of such applications being incorporated by reference herein.

BACKGROUND OF THE INVENTION

1. Field of the Invention

The present invention relates to a method for the secured release of an electromechanically actuable parking brake which has a brake piston, which acts on a friction element and is displaceable into an actuation position in a brake calliper in which it presses the friction element against a brake disc, and a spindle/nut arrangement which is driven by an electric motor, is coaxial with respect to the central axis of the brake piston and has the purpose of mechanically locking the brake piston in the actuation position, the nut of which spindle/nut arrangement is secured against rotation and moved by a rotation of the spindle in a translatory fashion along the central axis either in abutment against the brake piston or away from the brake piston depending on the rotational direction, having the method steps:

driving of the spindle by means of the electric motor in the brake application direction until a predefined, maximum power drain, corresponding to a predefined brake application force, is reached, with simultaneous measurement of the power drain and detection of the rotational speed of the electric motor as a function of time.

2. Description of the Related Art

Such a method is known, for example, from DE 197 32 168 C2 which is incorporated by reference, which describes, inter alia, methods for actuating and/or applying and releasing an electromechanically actuable parking brake of the generic type mentioned at the beginning. However, the specified publication does not contain any indications of how an optimum distance, at which there is no risk of overheating of the interacting components, is set between the friction element or a brake lining and the brake disc.

SUMMARY OF THE INVENTION

An object of the present invention is therefore to disclose a method for the secured release of an electromechanically actuable parking brake, with which method the risk of overheating of the brake is very largely eliminated.

This object is achieved according to aspects of the invention by means of the following method steps:
(a) detection of a travel distance of the brake piston which corresponds to the brake application force, by means of a stiffness characteristic curve (F=f(x)), stored in a memory, of the brake calliper in the locked state;
(b) determination of a second travel distance by addition of a further travel distance value, which corresponds to the desired clearance value, to form the previously mentioned travel distance,
(c) driving of the electric motor in the release direction until the second travel distance has been covered,
(d) comparison of the vehicle speed with a predefined first speed value, at the upward transgression of which the electric motor is driven once more in the release direction until a further, previously defined travel distance has been covered, during which travel distance it is ensured, in a secured fashion, that no contact takes place between the friction element and the brake disc of the vehicle brake.

It is particularly advantageous if, in the previously explained method, the vehicle speed is compared with a second predefined speed value, at the downward transgression of which the electric motor is driven in the brake application direction until the further travel distance has been covered.

According to a preferred embodiment of the method according to aspects of the invention, the predefined speed value is selected in such a way that the further travel distance can still be covered before the vehicle is in a stationary state. By virtue of these measures, the short activation time of the parking brake continues to be ensured.

It is particularly preferred to develop the method according to aspects of the invention to the effect that the travel distance which corresponds to the actually set clearance is measured when the brake is next applied. The travel distance which is covered in the time interval $t_0$ to $t_1$ is preferably taken as the measured value of the travel distance, where $t_0$ is the time when the driving of the electric motor in the brake application direction starts, and $t_1$ is the time at which the time derivative of the rotational speed first drops below a limiting value and thereafter drops below it for longer than a predefined time period.

If the measured travel distance drops below a predefined value, the desired travel distance is increased by a fixed absolute value. In contrast, if the measured travel distance exceeds a predefined value, the desired travel distance is reduced by a fixed absolute value. The abovementioned measures increase the accuracy of the method according to aspects of the invention and bring about adaptation to a variety of environmental influences.

BRIEF DESCRIPTION OF THE DRAWINGS

The method according to aspects of the invention is explained in more detail in the following description in conjunction with the appended drawing, in which:

FIG. 3 shows a stiffness characteristic curve of the brake calliper of the hydraulic vehicle brake according to FIG. 1;

DETAILED DESCRIPTION OF THE PREFERRED EMBODIMENTS

Figure 1:
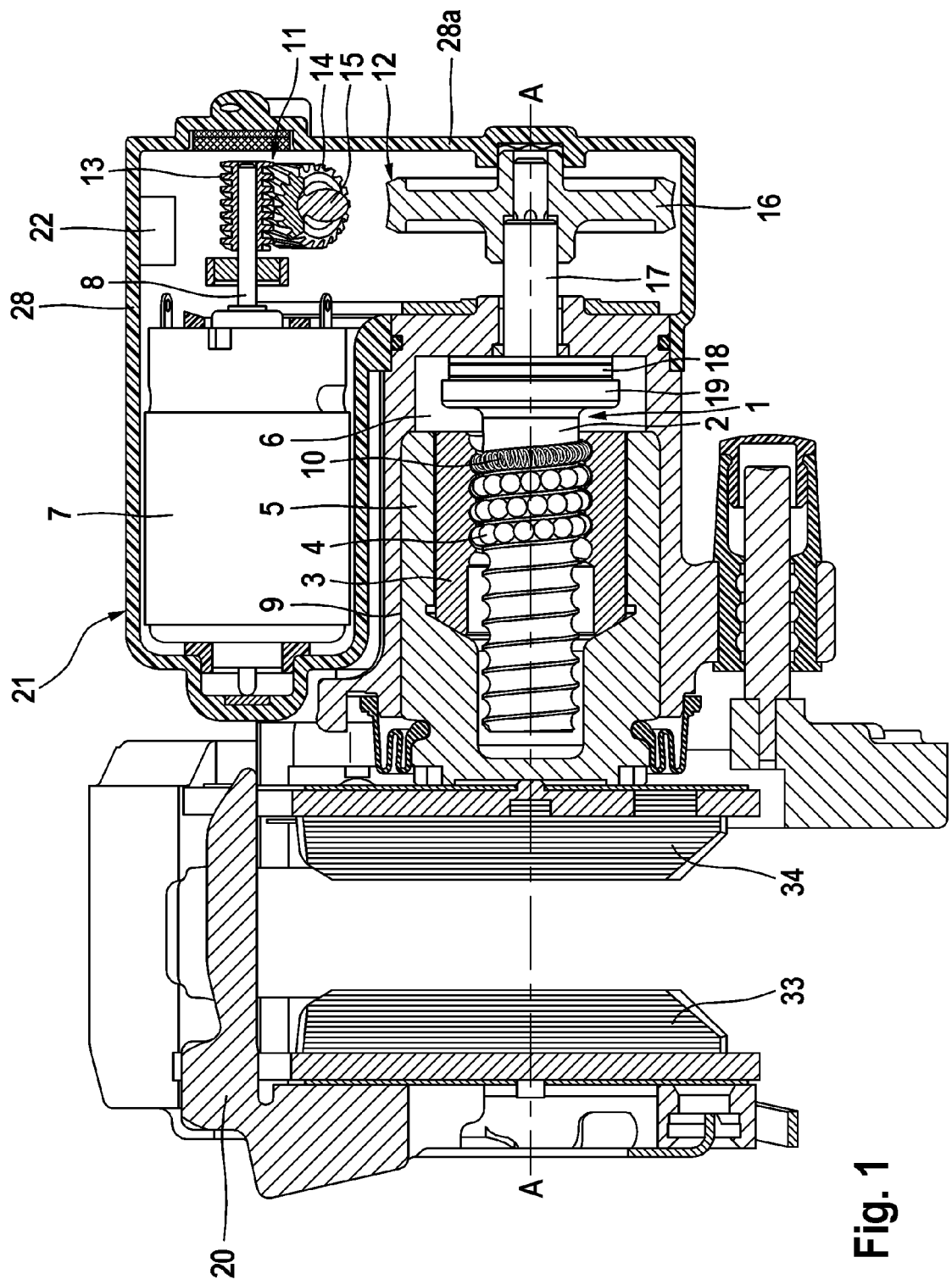
FIG. 1 shows an embodiment of a hydraulic vehicle brake with an electromechanical parking brake in an axial sectional illustration.

The inventive hydraulic vehicle brake which is illustrated in FIG. 1 has, on the one hand, a hydraulically actuable service brake and, on the other hand, an electromechanically actuable parking brake. The vehicle brake is embodied in the example shown as a floating calliper disc brake, the function of which is caused by a hydraulic actuation and is well known to a person skilled in the art in this field, and for this reason does not need to be explained in more detail. An electromechanical actuator or electric motor, which is integrated together with a two-stage transmission of the necessary sensor system and an electronic control unit 21 in a drive module 22, serves to actuate the parking brake. The abovementioned vehicle brake also has a brake housing and/or a brake calliper 20 which engages around the external edge of a brake disc (not illustrated), and two brake linings 33, 34 which are arranged on each side of the brake disc. The brake housing 20 forms, on its inner side, a brake cylinder 9 which accommodates a brake piston 5 in an axially displaceable fashion. In order to carry out service braking operations, brake fluid can be fed into the service pressure space 6 which is formed between the brake cylinder 9 and brake piston 5, with the result that a brake pressure is built up and pushes the brake piston 5 axially towards the brake disc along a piston longitudinal axis A. As a result, the brake lining 34 which faces the brake piston 5 is pressed against the brake disc, wherein, as a reaction, the brake housing 20 is pushed in the opposite direction and as a result also presses the other brake lining 33 against the brake disc.

As has already been mentioned, a parking brake device can be actuated electromechanically in order to carry out parking brake operations, and also acts on the brake piston 5. For this purpose, a gearbox 1 is provided which converts the rotational movement of the electromechanical actuator or electric motor 7 into a translational movement and brings about actuation of the brake piston 5 along the axis A. The gearbox 1 is formed essentially by a threaded spindle 2 and a threaded nut 3, which are connected to one another via rolling bodies 4. The rolling bodies 4 are embodied as balls. A stem 17 which is connected to the threaded spindle 2 projects, on the side facing away from the brake disc, out of the brake housing 20 and is driven by the previously mentioned electromechanical actuator 7 with intermediate connection of a two-stage step-down gearbox. In this context, means are provided for sealing off the service pressure space 6 in the bore, through which the stem 17 projects, in the brake housing 20. The rotational movement which is transmitted to the threaded spindle 2 is transmitted by the balls 4, located in the thread between the threaded spindle 2 and the threaded nut 3, to the threaded nut 3 which carries out a translational movement in the direction of the axis A. This also actuates the brake piston 5 on which the threaded nut 3 is supported. At the same time, the threaded spindle 2 is supported on the brake housing 20 by means of a collar 19 which is connected to the spindle 2, and a first axial bearing 18. The gearbox 1 therefore converts the rotational movement of the electromechanical actuator 7 into a linear movement and is responsible for the generation of the brake application force in order to carry out a parking brake operation.

When the gearbox 1 is actuated under load, the rolling bodies 4 roll in the thread. As a result, a comparatively high level of efficiency of 75% to 90% is achieved. In contrast, given load-free actuation of the gearbox 1, the rolling bodies 4 slip, i.e. the balls 4 slip until the brake lining 34 which is assigned to the brake piston 5 bears against the brake disc (not illustrated), because virtually load-free actuation occurs here. The balls 4 do not begin to roll until they are under load. The gearbox 1 therefore acts at the same time as a re-adjustment means if the brake linings 33, 34 are worn. Dispensing with a separate re-adjustment device or integrating a re-adjustment device and actuation device into a single component is particularly cost-effective and at the same time robust. So that the rolling of the rolling bodies 4 under load and the slipping in the case of load-free actuation of the gearbox 1 are always possible, a spring element 10 is provided which maintains a rolling distance for the rolling bodies to roll over.

The previously mentioned electric motor 7 and the two-stage gearbox are accommodated here by a housing 28 which is associated with the drive module 21 and can be closed off with a housing lid 28a. In the illustrated embodiment, the two-stage gearbox is embodied as a worm gear system 11, 12. Worm systems are a category of helical rolling-type gearbox in which, in contrast to rolling-type gearboxes, there is also a sliding portion in the movement. Such a worm gear pair is constructed from a gear which is toothed in a helical shape, a worm, and an obliquely toothed gear, the worm gear, which meshes with the latter.

The first gear stage, that is to say the first worm gear system 11, is connected on the input side to the output shaft 8 of the electric motor 7, while the second gear stage, that is to say the second worm gear system 12, is connected on the output side to the stem 17 or to the gearbox 1 or 2, 3. As is illustrated, a first worm 13 is plugged onto the output shaft 8 of the electric motor 7 and meshes with a first worm gear 14. A second worm 15 is plugged on to the rotational centre of the first worm gear 14 and is made to rotate thereby. The second worm 15 meshes in turn with a second worm gear 16, which is connected in a rotationally fixed fashion to the stem 17 and causes the stem 17 to rotate together with the gearbox 1 and at the same time generates a translatory movement of the brake piston 5. So that the brake application force which is set in this way is maintained during a parking brake operation, the second worm gear system 12 is embodied in a self-locking fashion.

Figure 2:
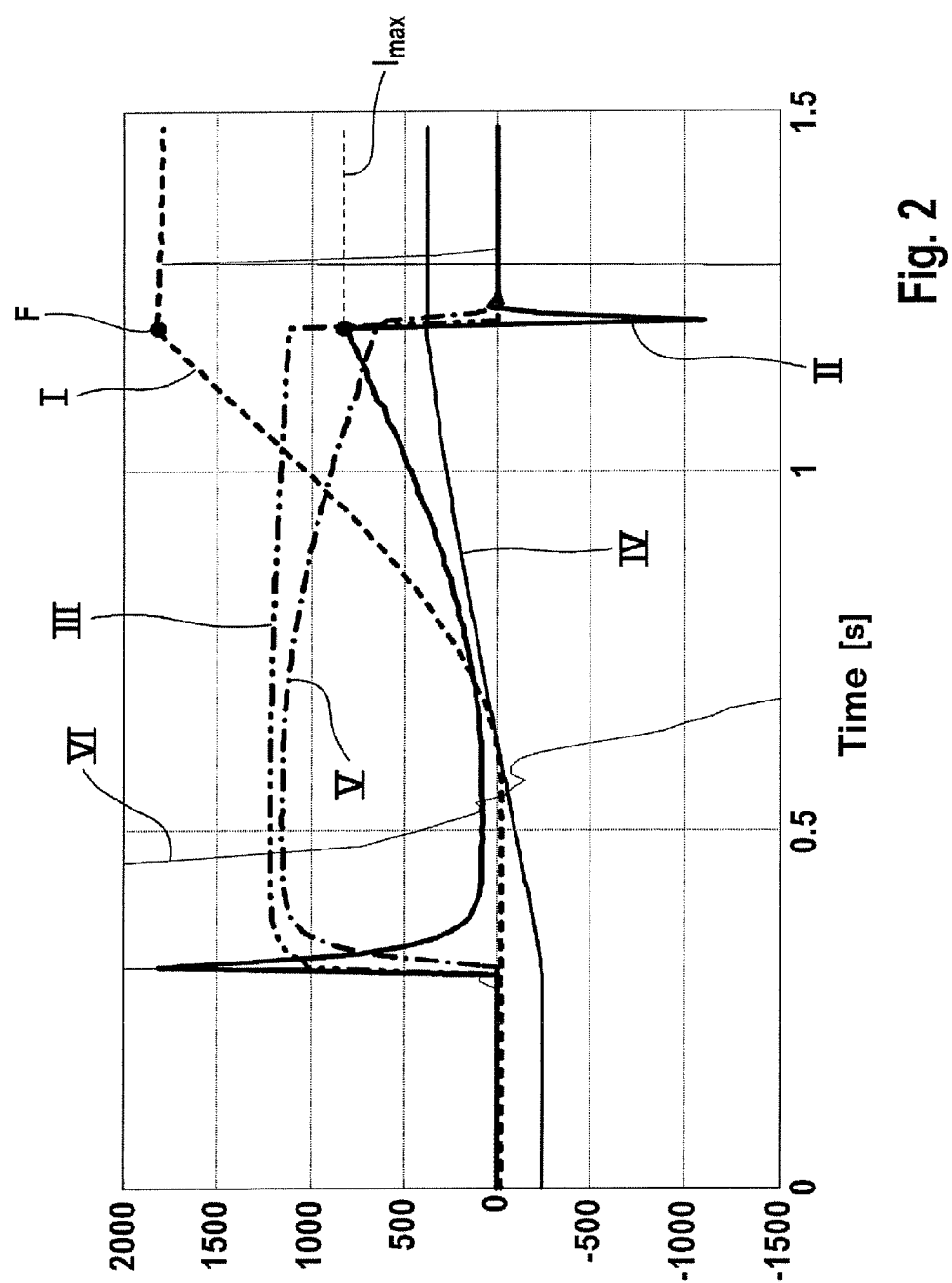
FIG. 2 shows a diagrammatic illustration of a brake application process of the electromechanical parking brake according to FIG. 1.
Figure 4A:
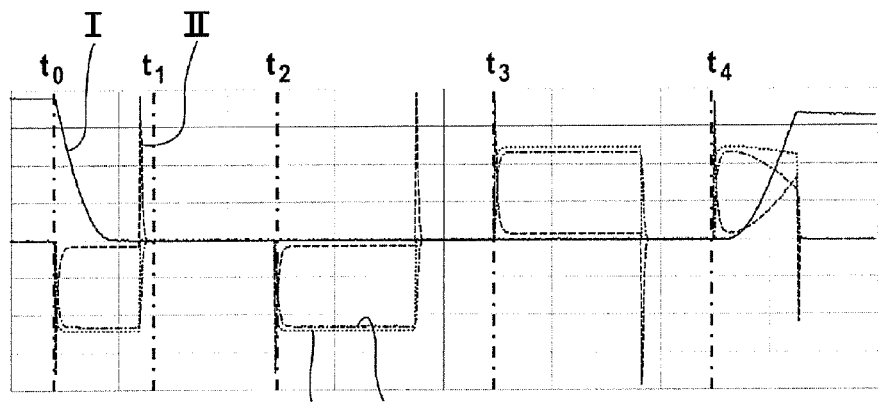
FIGS. 4a to 4c show corresponding time profiles of the parameters which are specific to the invention, these being the travel distance x of the brake piston and the vehicle speed v, in order to explain the method according to aspects of the invention.
Figure 4B:
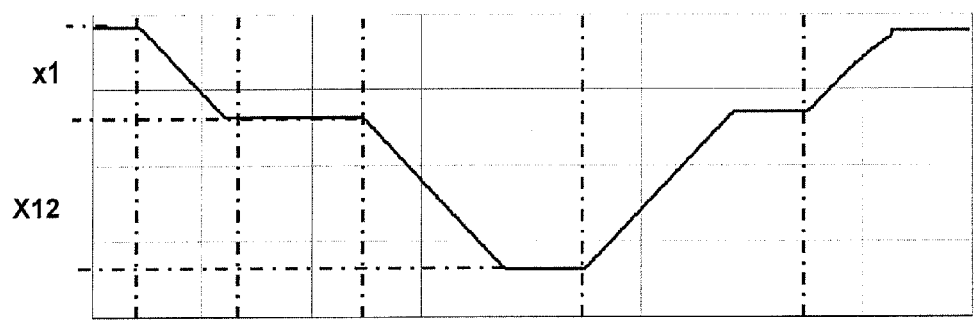
Figure 4C:
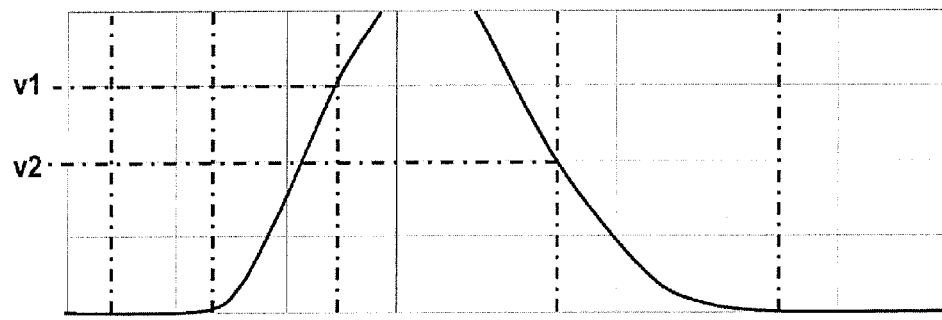

The method according to aspects of the invention is explained in more detail in the following description in relation to FIGS. 2 to 5. FIG. 2 illustrates a brake application operation of the electromechanical parking brake, in which operation the time profiles are shown for the brake application force (I), for the current (II) which is fed to the electric motor 7, for the voltage (III) which is applied to the electric motor 7, for the travel distance (IV) which is covered by the brake piston 5, for the rotational speed of the electric motor (V) and for the time derivative of the rotational speed (VI). At the start of the execution of the method according to aspects of the invention, the threaded spindle 2 is driven by the electric motor 7 in the brake application direction until a predefined, maximum power drain $I_{max}$, which corresponds to a predefined brake application force F, is reached. A stiffness characteristic curve (VII in FIG. 3), stored in a non-volatile memory contained in the electronic control unit 22, for the brake calliper in the locked state indicates that a travel distance of the brake piston 5, denoted by $x_0$, corresponds to the predefined brake application force F. In this context, the stiffness characteristic curve VII shows the dependence $F=f(x)$ of the brake application force F on the travel distance x of the brake piston 5. In the next method step, a second travel distance value $x_1$ [$(x_1=x_0+x_{11})$] is calculated by adding a further travel distance value $x_{11}$, corresponding to the desired clearance value, to the travel distance $x_0$. In a further method step, the threaded spindle 2 is driven in the opposite direction or the release direction of the parking brake (see FIGS. 4a, b, c, $t_0$) by means of the electric motor 7 until the brake piston 5 has covered the second travel distance $x_1$ (see FIGS. 4a, b, c, $t_1$). At the same time, the speed v of the vehicle is compared with a first predefined speed value $v_1$. If the speed v of the vehicle is higher than the first speed value $v_1$, the threaded spindle 2 is driven further in the release direction of the parking brake by means of the electric motor 7 until a further, previously defined travel distance $x_{12}$ has been covered (see FIGS. 4a, b, c, $t_2$). The travel distance $x_{12}$ is preferably defined here in such a way that after it has been covered by the brake piston 5, no contact takes place between the friction lining 33 and the brake disc of the vehicle brake. The speed v of the vehicle is also compared with a second speed value $v_2$ which is lower than the first speed value $v_1$. If the speed v of the vehicle drops significantly below the value $v_2$, the spindle is driven in the brake application direction by means of the electric motor 7. In this context, the second speed value $v_2$ is selected such that the further travel distance $x_{12}$ can still be covered before the vehicle is in a stationary state. The relationship between the previously mentioned travel distances $x_1$, $x_{12}$ and the speed v of the vehicle or the values $v_1$, $v_2$ thereof is illustrated in FIGS. 4b, 4c, wherein FIG. 4b shows the time profile of the travel distance x=f(t) when the parking brake is released, and FIG. 4c shows the time profile of the speed of the vehicle v=f(t).

Figure 5:
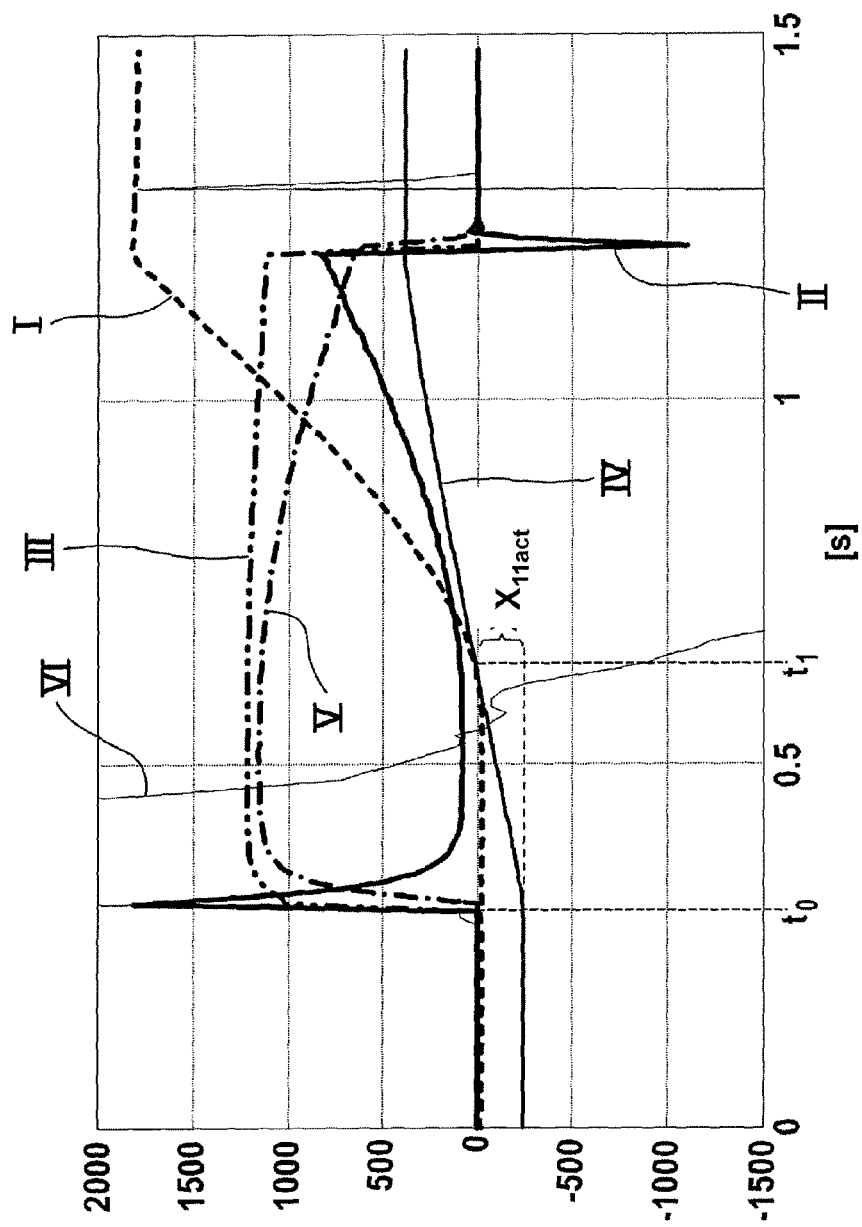
FIG. 5 shows a diagrammatic illustration, corresponding to FIG. 2, of a brake application process of the electromechanical parking brake, in order to explain the method according to aspects of the invention.

When the parking brake is next applied, the time profile for this being illustrated in FIG. 5, the actually set clearance or the travel distance $x_{11act}$ corresponding thereto is measured. The travel distance ($x_{11act}$) which is covered in the time interval $t_0$ up to $t_1$ is taken as the measured value, where $t_0$ is the time when the driving of the threaded spindle 2 in the brake application direction of the parking brake starts and $t_1$ is the time at which the time derivate VI of the rotational speed n first exceeds a limiting value and thereafter exceeds it for longer than a predefined time period.

The travel distance $x_{11act}$ which corresponds to the set clearance is subsequently compared with a first predefined value $x_{10}$. If the travel distance $x_{11act}$ drops below the above-mentioned value $x_{10}$, the travel distance $x_{11}$ which corresponds to the set clearance is increased by a fixed absolute value for the next release operation. If the value $x_{10}$ is not undershot, a second comparison is performed. If it becomes apparent from the second comparison that the travel distance $x_{11act}$ which corresponds to the set clearance is greater than $x_{10}$, the travel distance $x_{11}$ corresponding to the desired clearance is reduced by a fixed absolute value.

The invention claimed is:

1. Method for the secured release of an electromechanically actuable parking brake which has a brake piston, which acts on a friction element and is displaceable into an actuation position in a brake caliper in which it presses the friction element against a brake disc, and wherein a spindle/nut arrangement, which is driven by an electric motor, is coaxial with respect to a central axis of the brake piston and is configured to mechanically lock the brake piston in the actuation position, wherein the nut of the spindle/nut arrangement is secured against rotation and moved by a rotation of the spindle in a translatory fashion along the central axis either in abutment against the brake piston or away from the brake piston depending on a rotational direction, said method comprising the step of:

driving the spindle by the electric motor in a brake application direction until a predefined, maximum power drain ($I_{max}$), corresponding to a predefined brake application force (F), is reached, said driving step comprising the sub-steps of:

(a) detecting a first travel distance ($x_0$) of the brake piston which corresponds to the brake application force (F), by a stiffness characteristic curve, stored in a memory, of the brake caliper in a locked state, (b) determining a second travel distance ($x_1$) by addition of a third travel distance value ($x_{11}$), which corresponds to a desired clearance value, to the first travel distance ($x_0$), such that $x_1=x_0+x_{11}$, (c) driving the electric motor in a release direction until the second travel distance ($x_1$) has been covered by the brake piston, (d) comparing a vehicle speed (v) with a predefined first speed value ($v_1$) greater than zero, and when the vehicle speed (v) exceeds the predefined first speed value ($v_1$), the electric motor is driven once more in the release direction until a fourth predefined travel distance ($x_{12}$) has been covered, during which it is insured, in a secured fashion, that no contact takes place between the friction element and the brake disc of the vehicle brake, and (e) comparing the vehicle speed (v) with a predefined second speed value ($v_2$) greater than zero and less than the predefined first speed value ($v_1$), and when the vehicle speed (v) falls below the predefined second speed value ($v_2$) after exceeding the predefined first speed value ($v_1$), the electric motor is driven in the brake application direction until the fourth predefined travel distance ($x_{12}$) has been covered.

2. Method according to claim 1, wherein the predefined second speed value ($v_2$) is selected in such a way that the fourth predefined travel distance ($x_{12}$) can still be covered before the vehicle is in a stationary state.

3. Method according to claim 1, wherein a fifth travel distance ($x_{11act}$) which corresponds to an actually set clearance is measured when the brake is next applied.

4. Method according to claim 3, wherein the fifth travel distance is a distance which is covered in the time interval $t_0$ to $t_1$, where $t_0$ is the time when the driving of the electric motor in the brake application direction starts, and $t_1$ is the time at which a time derivative (dn/dt) of a rotational speed (n) first drops below a limiting value and thereafter drops below it for longer than a predefined time period.

5. Method according to claim 3, wherein, when the fifth travel distance ($x_{11act}$) drops below a predefined travel distance value ($x_{10}$), the third travel distance ($x_{11}$) is increased by a fixed absolute value.

6. Method according to claim 3, wherein, when the fifth travel distance ($x_{11act}$) exceeds a predefined travel distance value, the third travel distance ($x_{11}$) is reduced by a fixed absolute value.

* * * * *